(12) United States Patent  (10) Patent No.: US 7,837,104 B2
Lum  (45) Date of Patent: *Nov. 23, 2010

(54) MONITOR WITH INTERCHANGEABLE BASE AND MONITOR MOUNT FOR POINT-OF-SALE APPLICATIONS

(75) Inventor: Jackson Lum, Roslyn, NY (US)

(73) Assignee: Logic Controls, Inc., New Hyde Park, NY (US)

( * ) Notice: Subject to any disclaimer, the term of this patent is extended or adjusted under 35 U.S.C. 154(b) by 605 days.

This patent is subject to a terminal disclaimer.

(21) Appl. No.: 11/768,320

(22) Filed: Jun. 26, 2007

(65) Prior Publication Data

US 2008/0023612 A1    Jan. 31, 2008

Related U.S. Application Data

(63) Continuation-in-part of application No. 11/241,735, filed on Sep. 30, 2005.

(60) Provisional application No. 60/615,384, filed on Sep. 30, 2004.

(51) Int. Cl.
*G06K 15/00* (2006.01)
(52) U.S. Cl. .................. 235/383; 235/381; 235/379
(58) Field of Classification Search ................. 235/379, 235/381, 383
See application file for complete search history.

(56) References Cited

U.S. PATENT DOCUMENTS

| 5,594,920 A | 1/1997 | Ebina et al. |
| 5,707,162 A | 1/1998 | Kasai et al. |
| 5,794,214 A | 8/1998 | Ebina et al. |
| 5,808,283 A | 9/1998 | Stanton et al. |
| 5,941,618 A | 8/1999 | Cheng |
| 6,003,008 A | 12/1999 | Postrel et al. |
| 6,053,410 A | 4/2000 | Wike, Jr. et al. |
| 6,065,677 A | 5/2000 | Lippert et al. |
| 6,705,520 B1 | 3/2004 | Pitroda et al. |
| 6,729,242 B2 | 5/2004 | Kerber |
| 6,769,607 B1 | 8/2004 | Pitroda et al. |
| 7,654,446 B2* | 2/2010 | Lum .......................... 235/379 |
| 2002/0153414 A1 | 10/2002 | Stoutenburg et al. |

(Continued)

OTHER PUBLICATIONS

TOM-XV Series, 15" LCD Touchmonitor, Pioneerpos, Inc., p. 1 (2004).

(Continued)

*Primary Examiner*—Karl D. Frech
(74) *Attorney, Agent, or Firm*—Hoffmann & Baron, LLP (57) ABSTRACT

A point-of-sale system includes a monitor and interchangeable bases. The monitor is attached to the interchangeable base using a Video Electronics Standards Association (VESA) mount. The system may also include a monitor support disposed between the monitor and the interchangeable base, in which case the monitor is attached to the monitor support using the VESA mount, and the monitor support is attached to the interchangeable base. A housing may be used to enclose the VESA mount and the monitor support. A method of displaying point-of-sale information includes providing a monitor and adapting a plurality of interchangeable bases to attach to the monitor using a Video Electronics Standards Association (VESA) mount. The method may also include disposing a monitor support between the monitor and the interchangeable base, attaching the monitor to the monitor support using the VESA mount, and attaching the monitor support to the interchangeable base.

10 Claims, 11 Drawing Sheets

U.S. PATENT DOCUMENTS

| | | |
|---|---|---|
| 2002/0156683 A1 | 10/2002 | Stoutenburg et al. |
| 2003/0132292 A1* | 7/2003 | Gomez et al. ............... 235/383 |
| 2004/0059634 A1 | 3/2004 | Tami et al. |
| 2004/0159699 A1 | 8/2004 | Nelson et al. |
| 2004/0164863 A1 | 8/2004 | Fallin et al. |
| 2004/0172276 A1 | 9/2004 | Kamo |
| 2004/0172339 A1 | 9/2004 | Snelgrove et al. |
| 2004/0181453 A1 | 9/2004 | Ray et al. |
| 2007/0241184 A1 | 10/2007 | Lum |

OTHER PUBLICATIONS

AIO-XV Series, 15" All-in-One Touchscreen System, Pioneerpos, Inc., p. 1 (2004).
PXI Series, All-in-One Touch System, Pioneerpos, Inc., p. 1 (2004).
JIVA 5800, Thick-Client Terminal Solutions, Posiflex Business Machines, Inc.., pp. 1-4 (2002).
NCR RealPOS™ 62 Workstation, NCR Corporation, pp. 1-2 (2003).
Beetle POS Family Beetle/iPOS, Wincor Nixdorf International GmbH, pp. 1-2 (2003).

* cited by examiner

MONITOR WITH INTERCHANGEABLE BASE AND MONITOR MOUNT FOR POINT-OF-SALE APPLICATIONS

CROSS REFERENCE TO RELATED APPLICATION

This application is a continuation-in-part of U.S. application Ser. No. 11/241,735 filed on Sep. 30, 2005, which claims the benefit of U.S. Provisional Application No. 60/615,384 filed on Sep. 30, 2004, the disclosures of which are incorporated herein by reference.

BACKGROUND OF THE INVENTION

1. Field of the Invention

The present invention generally relates to point-of-sale (POS) terminal systems, and more particularly to providing an interchangeable base and monitor mount in a POS terminal system.

2. Description of the Related Art

Point-Of-Sale (POS) terminal systems are commonly used in retail stores, supermarkets, and restaurants for sales transactions. In a typical terminal system, popular components include a cash drawer, receipt printer, credit card reader, bar code reader, monitor, customer display, POS keyboard, touch screen monitor, and computer. However, In most POS customer service areas, counter space is limited.

Therefore, although it may be advantageous to integrate several components into one compact unit, a high degree of integration has at least one drawback. Specifically, different components have different usable life spans. Therefore, a single outdated component can render the entire system obsolete even if the remaining components are perfectly functional and up-to-date. In an integrated POS terminal system, the computer and monitor providing excellent examples of components that are readily outdated.

Figure 1:
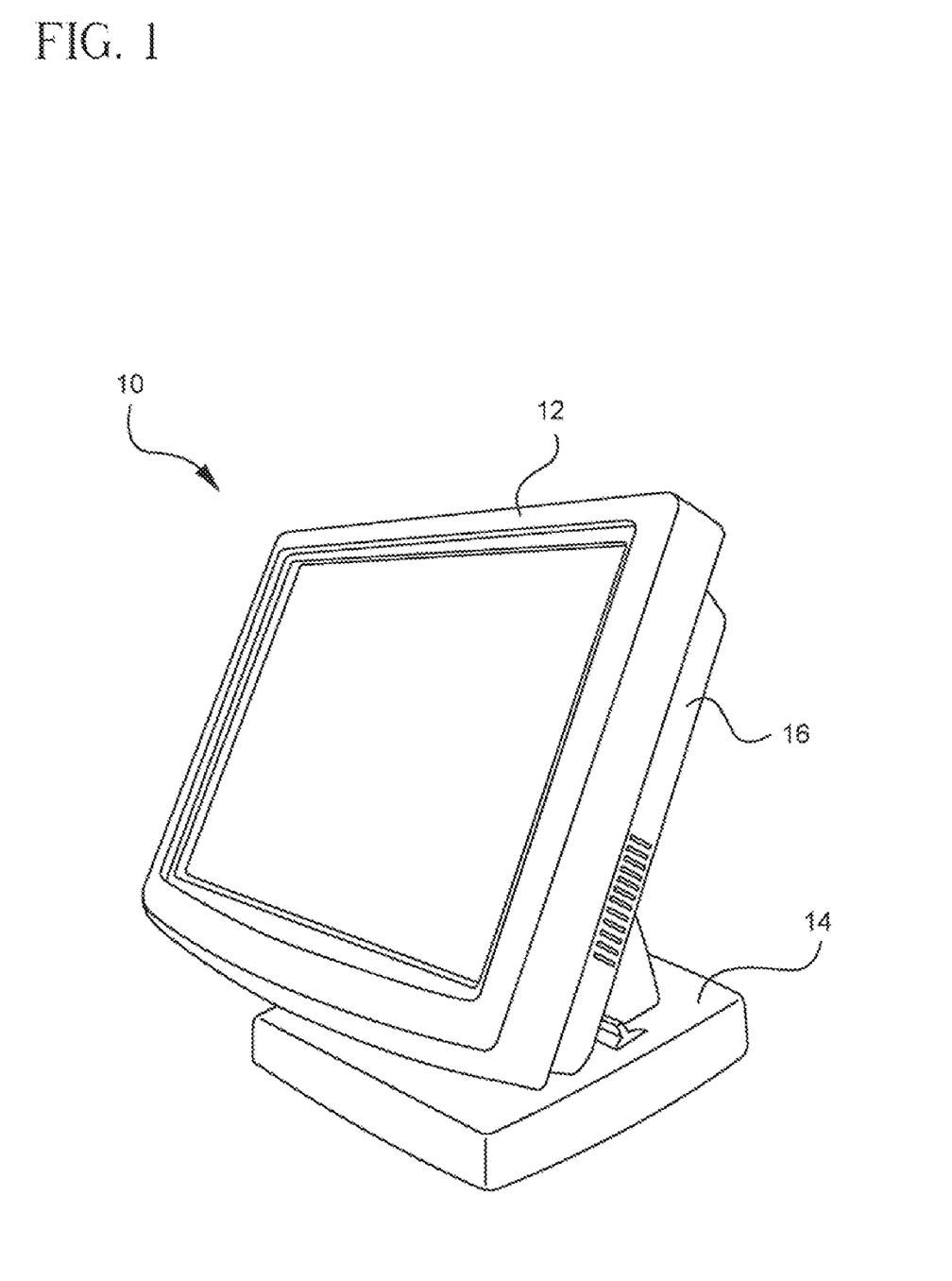
FIG. 1 is a perspective view of a conventional point-of-sale integrated terminal system.

A conventional All-In-One or integrated POS terminal system 10, in which each of the components is integrated into a single assembly, is shown in FIG. 1. The display is often a touch screen Liquid Crystal Display monitor (LCD) 12. The electronics required to power and drive the touch screen monitor 12 are generally housed behind the display 16.

Important components of the integrated terminal system 10 are the computer (not shown) and monitor. In FIG. 1, the computer is located either inside a base 14 or in a rear portion of the terminal housing 16. In either case, the computer and monitor are integral parts of the system and are not separable from the remaining assembly to enable the computer and/or monitor to be upgraded or replaced.

Thus, there is a need in the field of POS terminal systems for an alternative that would provide the advantages of conventional integrated POS terminal systems, which include many essential components, while addressing the limitation of rendering an entire system obsolete and/or unusable with a single outdated component, such as the computer or monitor. In addition, there is a need to improve flexibility in customizing the features of an integrated POS terminal system.

SUMMARY OF THE INVENTION

These and other goals, purposes, and objectives are met by the present invention that provides a point-of-sale system, which includes a monitor and a plurality of interchangeable bases. The monitor is attached to the interchangeable base using a Video Electronics Standards Association (VESA) mount. The system may also include a monitor support disposed between the monitor and the interchangeable base, in which case the monitor is attached to the monitor support using the VESA mount, and the monitor support is attached to the interchangeable base. A housing may be used to enclose the VESA mount, and a housing may be used to enclose the monitor support.

The present invention also provides a point-of-sale monitor, which includes a display and a monitor support. The monitor support is attached to the display using a Video Electronics Standards Association (VESA) mount. The monitor support is adapted to be attached to a plurality of interchangeable bases. A housing may be adapted to enclose the VESA mount.

The present invention still further provides a method of displaying point-of-sale information, which includes providing a monitor and adapting a plurality of interchangeable bases to attach to the monitor using a Video Electronics Standards Association (VESA) mount. The method may also include disposing a monitor support between the monitor and the interchangeable base, attaching the monitor to the monitor support using the VESA mount, and attaching the monitor support to the interchangeable base. The method may further include adapting a housing to enclose the VESA mount, and adapting a housing to enclose the monitor support.

These and other objectives, features, and advantages of this invention will become apparent from the following detailed description of illustrative embodiments thereof, which is to be read in connection with the accompanying drawings.

DETAILED DESCRIPTION OF THE PREFERRED EMBODIMENTS

Figure 2:
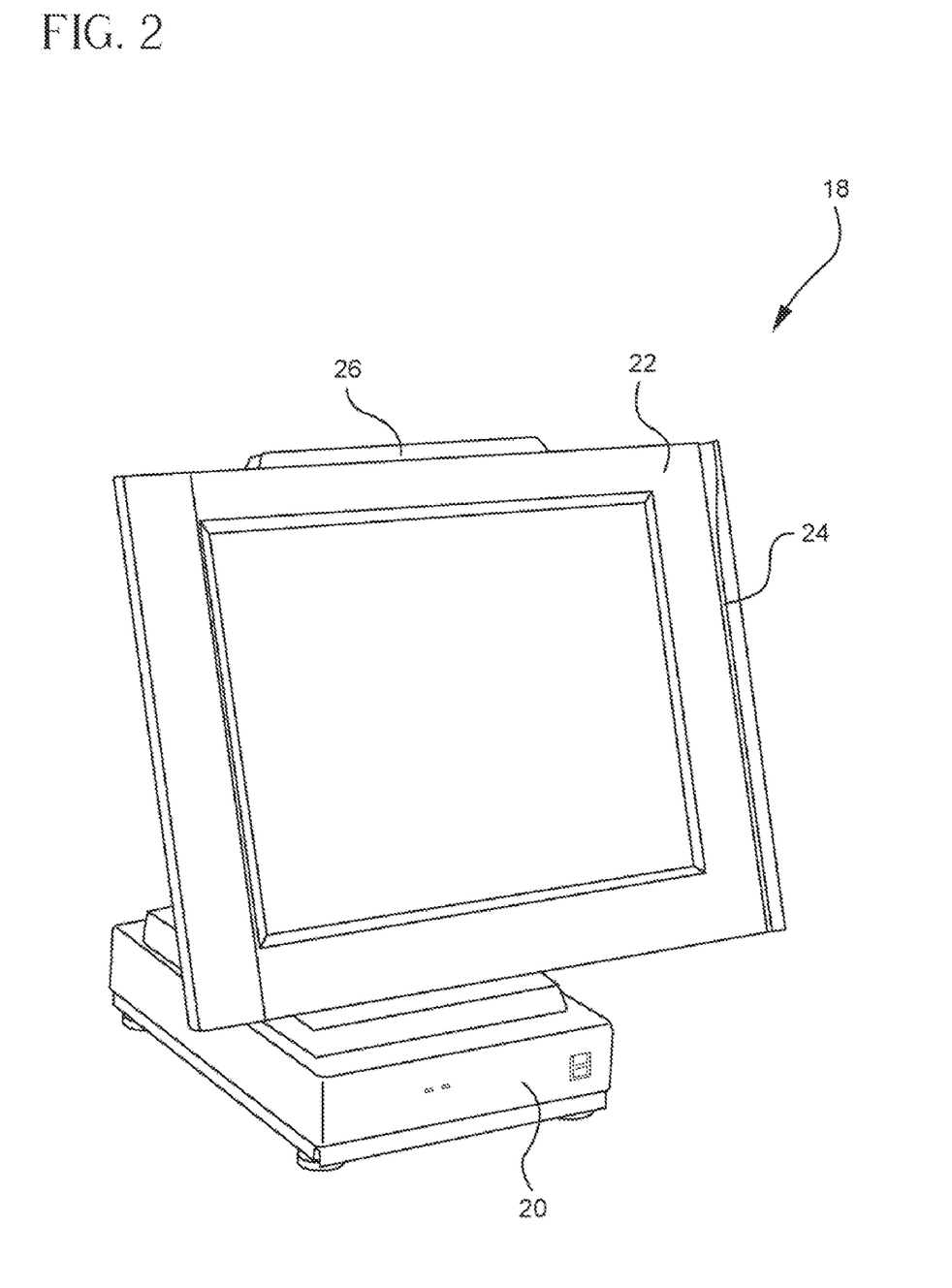
FIG. 2 is a perspective view of an integrated terminal system with an interchangeable base in accordance with the present invention.

In accordance with the present invention, FIG. 2 shows a first embodiment of an integrated point-of-sale (POS) terminal system 18 with a removable and/or interchangeable computer base 20. An upper section of the system 18 preferably includes a touch screen liquid crystal display (LCD) monitor 22, a credit card reader 24, which is preferably located on the righthand side of the monitor 22, and a customer display 26, which is preferably mounted on the rear side of the LCD monitor and is only partially visible near the top of the monitor 22.

Figure 3:
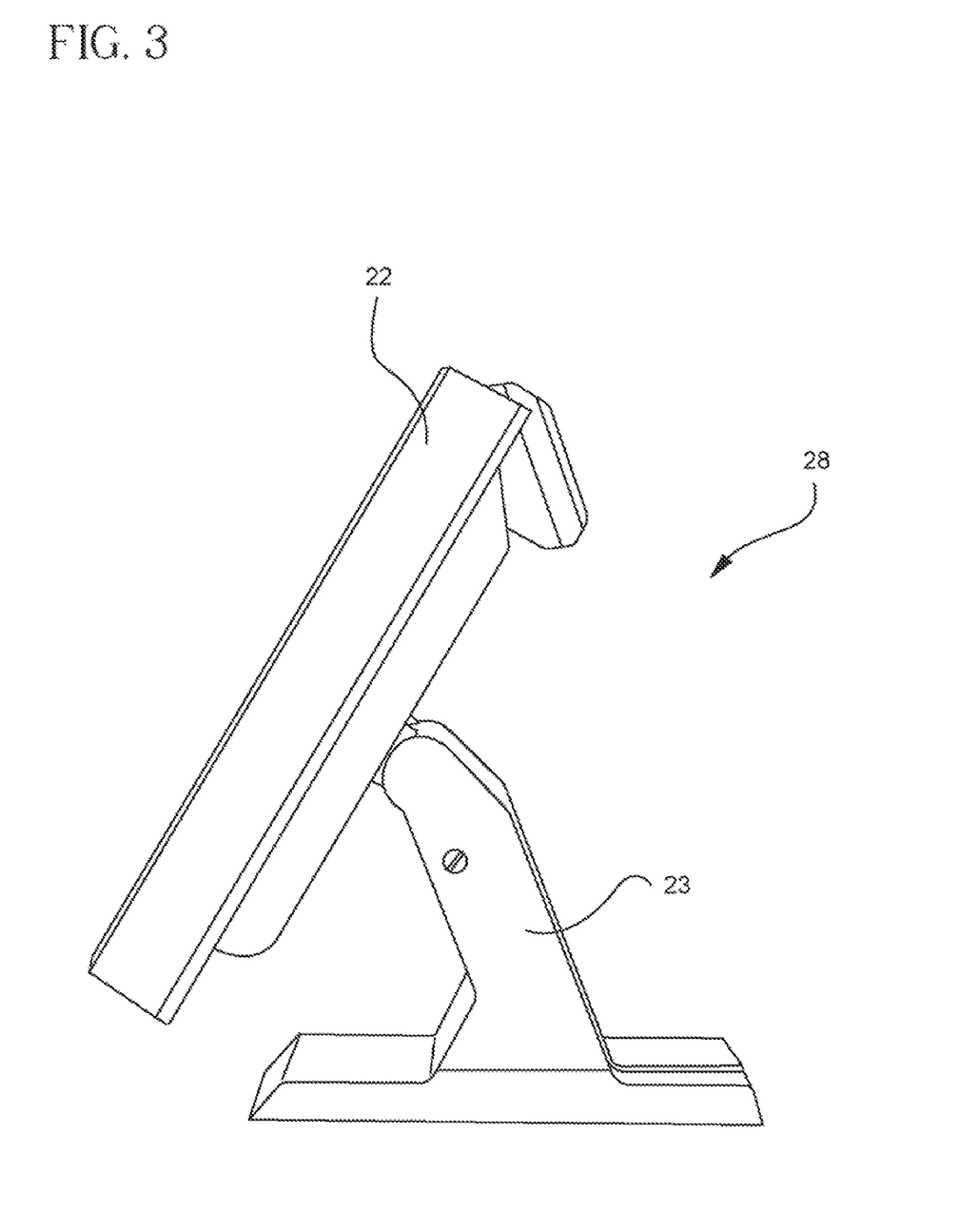
FIG. 3 is a side view of a monitor shown in FIG. 2.

The lower section of the system 18 preferably includes a readily detachable computer housing or interchangeable base 20. The upper section 28 of the system 18 and the lower section 30 are shown in FIGS. 3 and 4, respectively, detached from each other.

Figure 4:
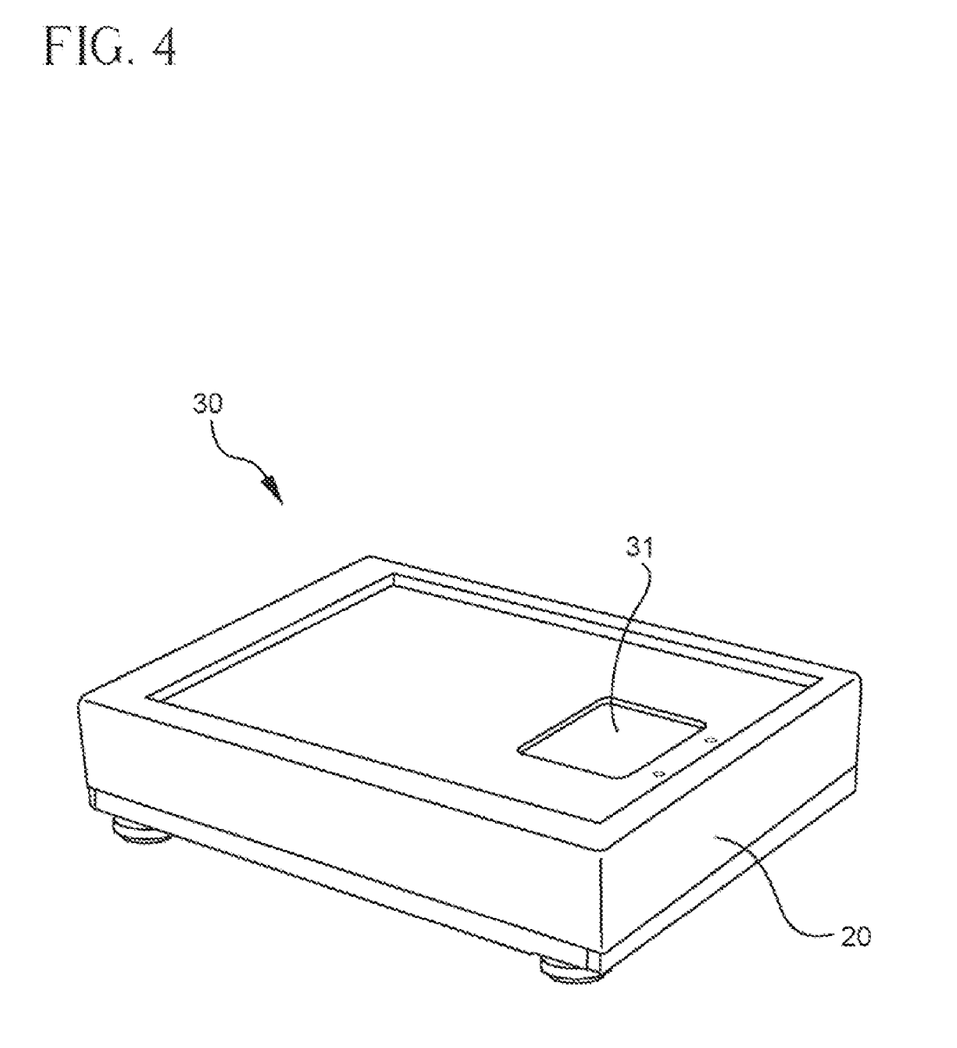
FIG. 4 is a perspective view of an interchangeable base shown in FIG. 2.
Figure 5:
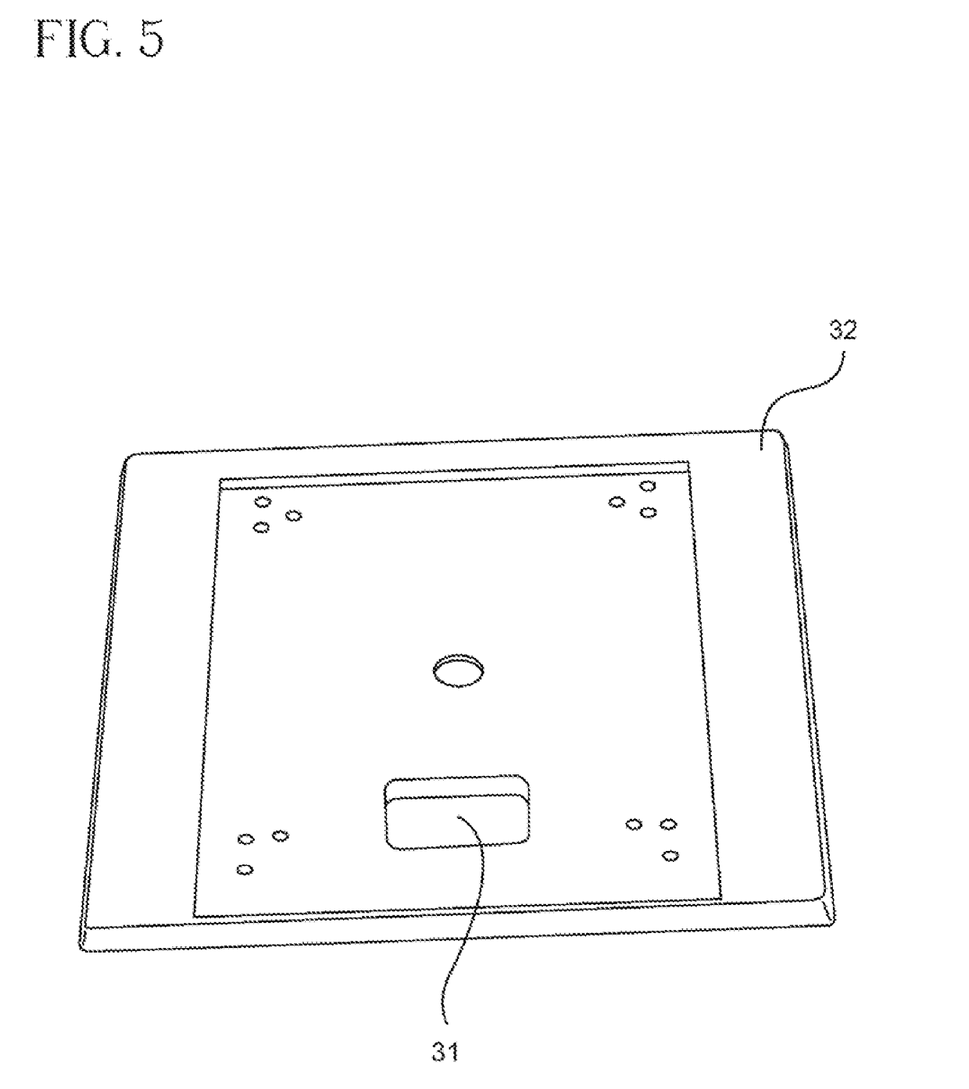
FIG. 5 is a perspective view of a second embodiment of the interchangeable base shown in FIG. 4.
Figure 6:
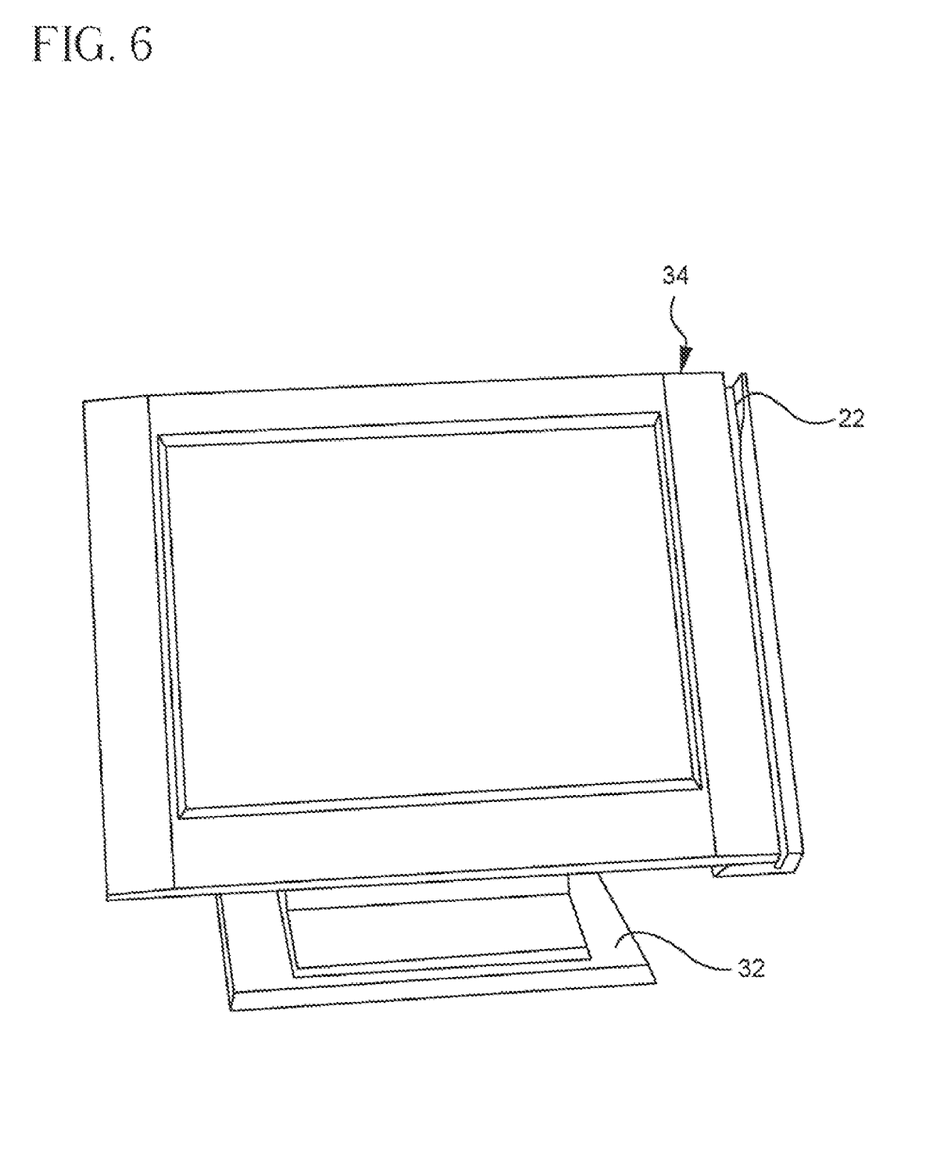
FIG. 6 is a perspective view of a second embodiment of the integrated terminal system with interchangeable base shown in FIG. 2.
Figure 7:
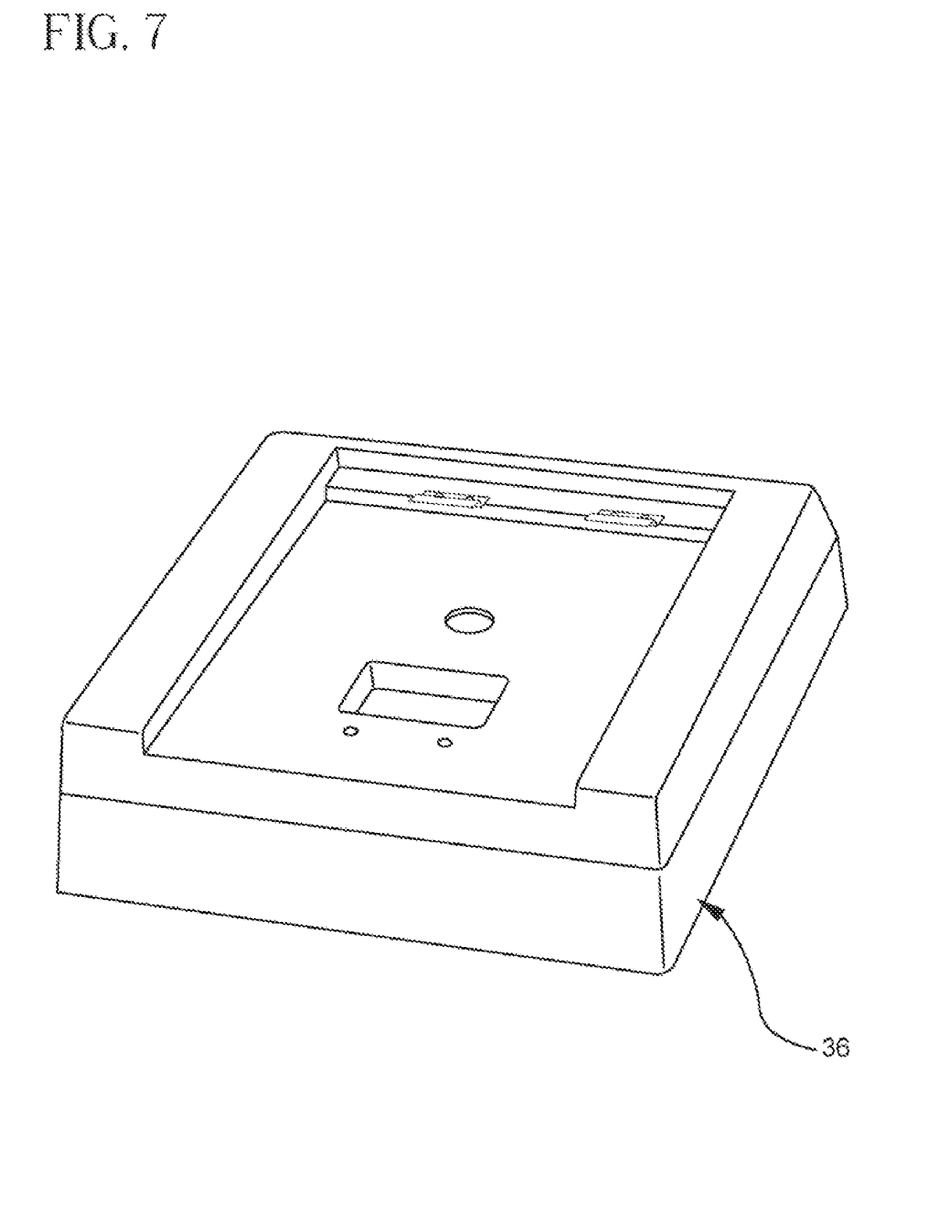
FIG. 7 is a perspective view of a third embodiment of the interchangeable base shown in FIG. 4.
Figure 8:
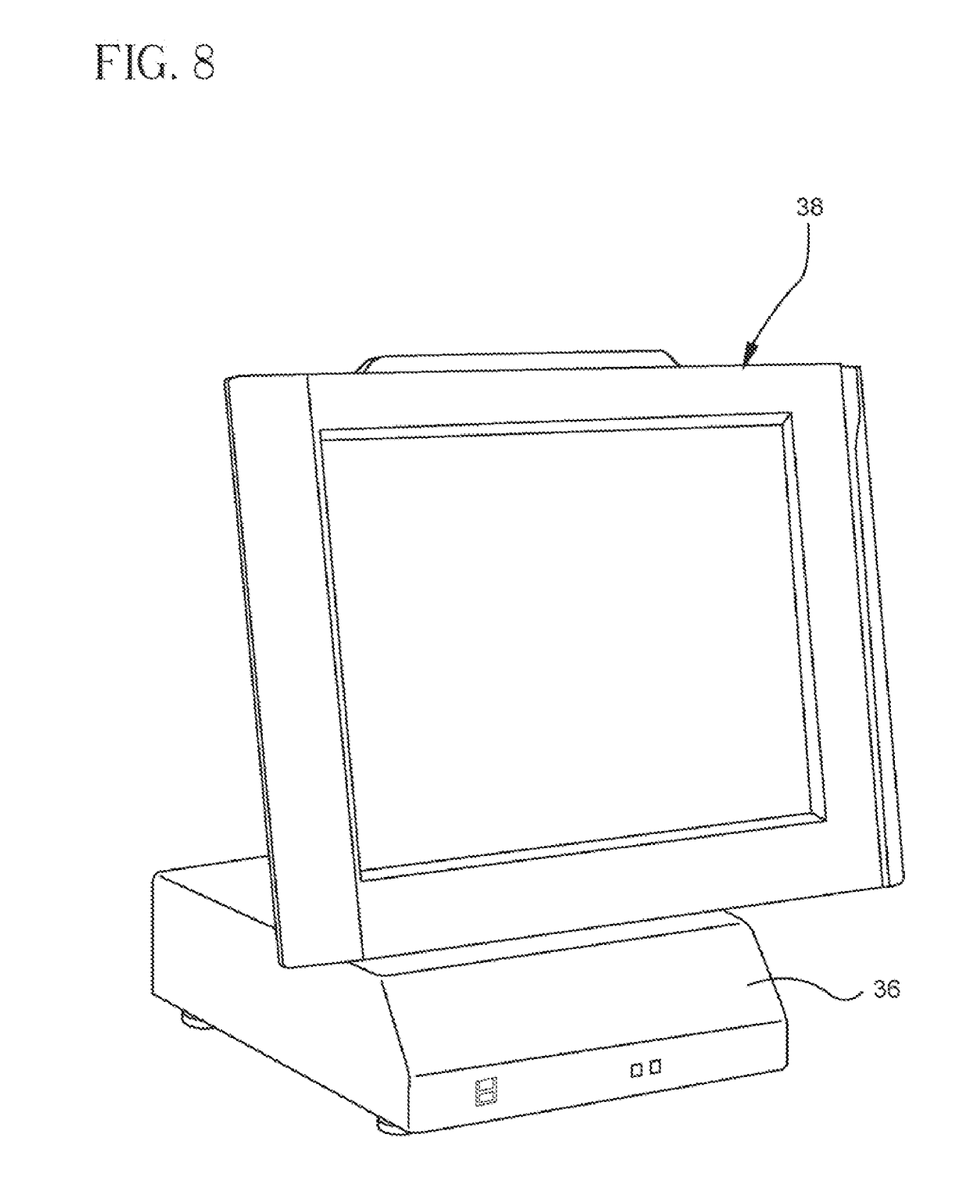
FIG. 8 is a perspective view of a third embodiment of the integrated terminal system with interchangeable base shown in FIG. 1.

The interchangeable base 20, which is preferably used to enclose the computer (not shown) is shown in FIG. 4 and can be replaced with different bases, such as those shown in FIGS. 5 and 7, to achieve different dimensions, functionality, and/or performance. For example, if a simple passive base 32 shown in FIG. 5 is used, a simple terminal system 34 shown in FIG. 6, which includes a basic touch screen monitor 22, can be achieved. Alternatively, if a more powerful computer requires a larger active base 36 shown in FIG. 7, a high-performance terminal system 38 shown in FIG. 8 can be achieved.

The interchangeable base 20 may incorporate an opening 31 to permit cabling and other connections to be made between the upper and lower sections of the POS terminal system or to merely enable the connections to pass through the interchangeable base 20. The interchangeable base 20 preferably performs the following functions:

1. It encloses a computer board, which is preferably used as a central processing unit (CPU) for the POS terminal system. The computer board or processing device preferably includes a computer, microprocessor, microcontroller, application specific integrated circuit (ASIC), and/or programmable logic device.
2. It encloses and anchors excess cables to the computer board from the monitor, magnetic strip reader (MSR), customer display, speakers, fingerprint verifier, printer, bar code reader, cash drawer, keyboard, mouse, and other peripherals that may be associated with and/or integrated in the POS terminal system.
3. It facilitates and simplifies the serviceability of the POS terminal system. Accordingly, by removing all the attached cables and only one or more screws, the entire computer unit can be detached for repair, upgrade or relocation.
4. Interface cables from the monitor and attached peripherals preferably enter the interchangeable base through the opening in the top surface of the base. Interface cables from other peripherals preferably enter the base through a bottom and/or rear opening (not shown).
5. The front side of the adapter base unit can support all computer user interface functions, such as a power on/off switch, reset switch, power on indicator, hard drive activity indicator, beeper, and I/O ports, such as universal serial bus (USB) ports.

The interchangeable base is particularly advantageous since it overcomes problems associated with variations in the useful life of different components integrated in the POS terminal system. For example, the user may upgrade or downgrade the computer and/or monitor associated with the terminal system while continuing to use the same monitor or computer, which may have a longer usable life than the replaced component.

Figure 9:
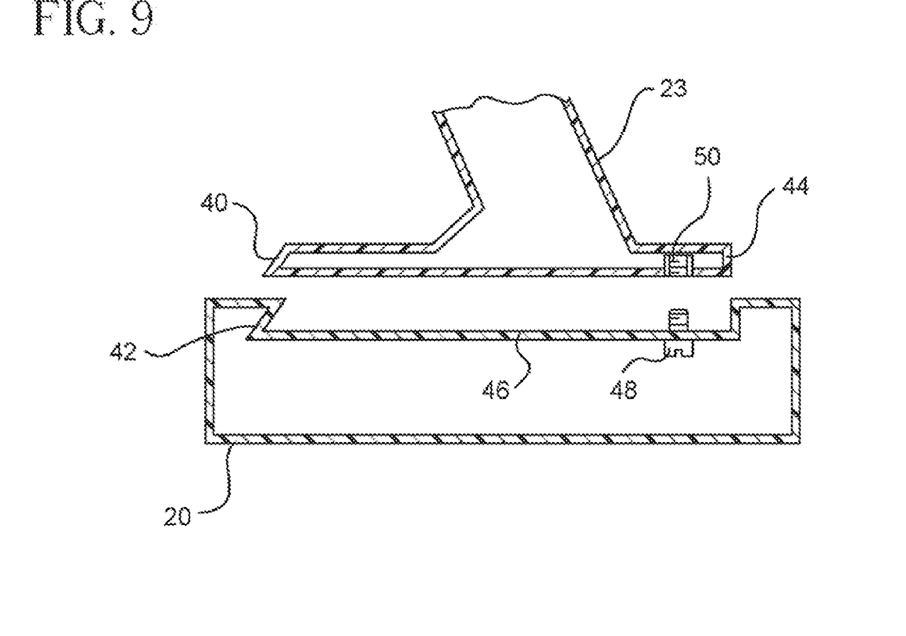
FIG. 9 is a side view showing a first embodiment of a method for mounting the monitor to the interchangeable base in accordance with the present invention.
Figure 10:
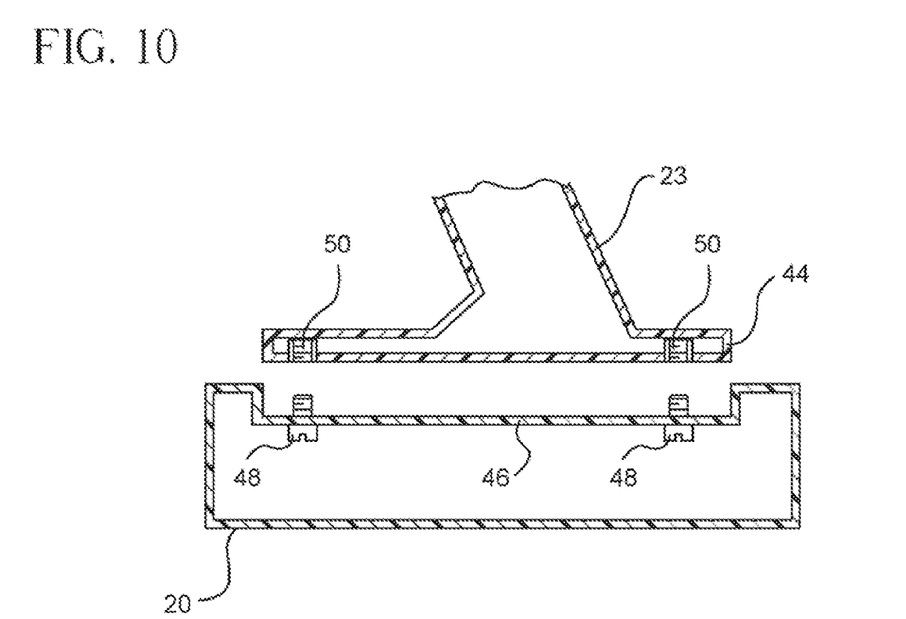
FIG. 10 is a side view showing a second embodiment of a method for mounting the monitor to the interchangeable base in accordance with the present invention.

Two embodiments of methods for attaching the monitor 22, which is preferably attached to the interchangeable base 20 using a monitor support 23, are shown in FIGS. 9 and 10. In the first embodiment shown in FIG. 9, a tapered base edge 40 of the monitor support 23 is preferably slid into a tapered recess 42 in the interchangeable base 20. A front base portion 44 is then preferably lowered into a straight recess 46 in the interchangeable base 20. The monitor support 23 and interchangeable base 20 are then preferably fastened together using a screw 48 and a mating nut 50. The first mounting method provides the minimum number of screws required to attach the monitor support 23 to the interchangeable base 20.

A second embodiment is shown in FIG. 10, in which no tapered edges are used and the monitor support 23 is placed into two straight recesses 46 in the interchangeable base 20. Two to four mounting screws 48 and nuts 50 are preferably used to attach the monitor support 23 to the interchangeable base 20 in the second embodiment. The second embodiment provides the advantages of simplicity and lower cost in tooling.

Figure 11:
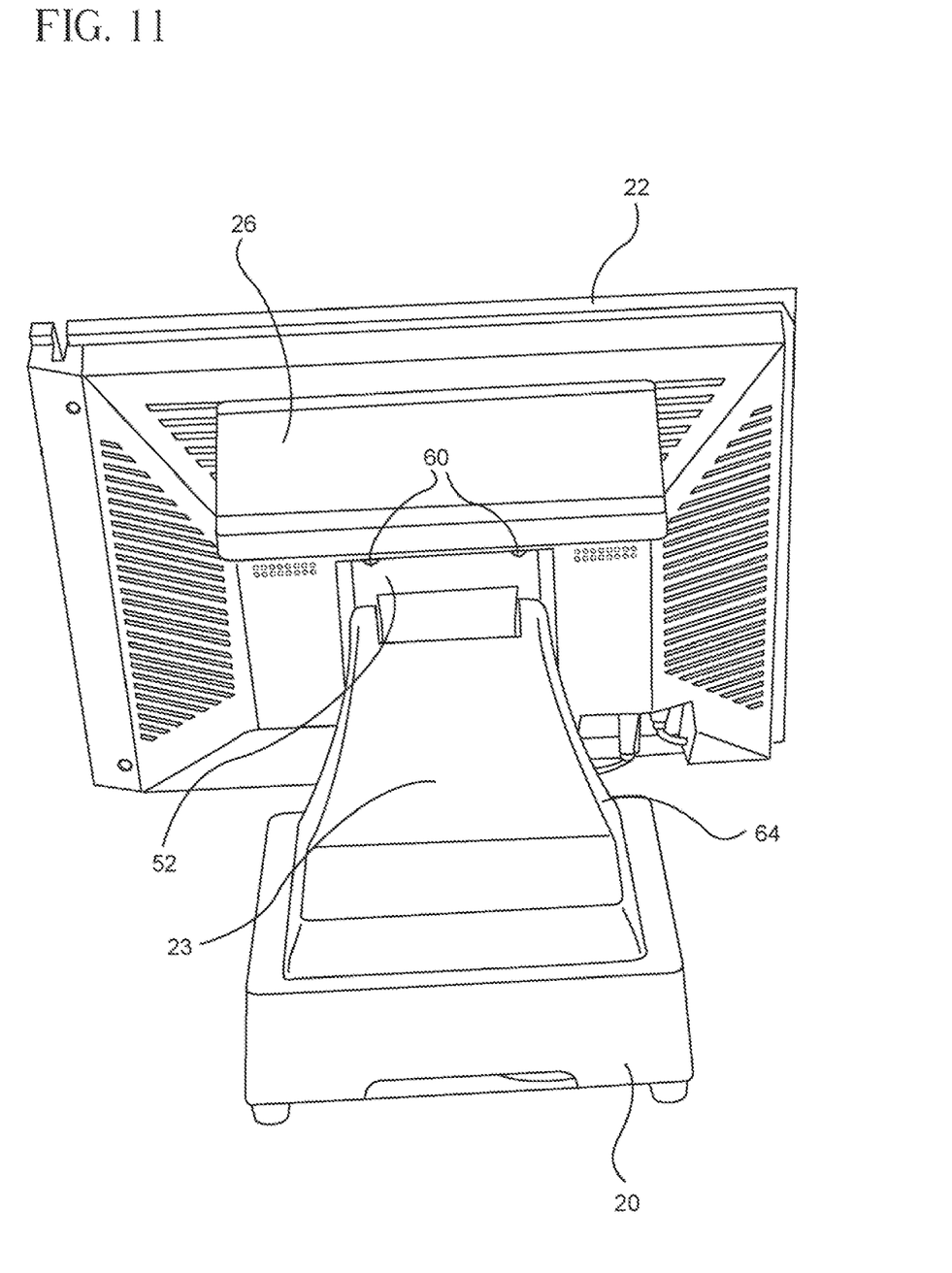
FIG. 11 is a rear pictorial view showing a third embodiment of a method for mounting the monitor to the interchangeable base in accordance with the present invention.

FIG. 11 shows that the monitor 22 is preferably attached to the monitor support 23 using a Flat Display Mounting Interface (FDMI), also known as the VESA Mounting Interface Standard (MIS) or a VESA mount 52. The VESA mount 52 refers to a family of standards defined by the Video Electronics Standards Association conventionally used for mounting flat-panel monitors, televisions, and other displays to walls. However, the VESA mount 52 is used in accordance with the present invention to provide a mounting method that enables the generic monitor support 23 to attach a wide variety of monitors 22 to the system.

The original VESA mount (MIS-D) included four screws arranged in a square, with the horizontal and vertical distance between the screw centers being 100 mm. A 75 mm×75 mm layout is defined for smaller displays.

The MIS-D screw holes have an M4 thread and are typically 10 mm deep. The FDMI was extended with a collection of additional screw patterns that are more appropriate for larger displays as shown in the following Table 1.

TABLE 1

| | |
|---|---|
| MIS-D 75 | 75 mm × 75 mm |
| MIS-D 100 | 100 mm × 100 mm |
| MIS-E | 200 mm × 100 mm |
| MIS-F | 200 mm × 200 mm |
| | 400 mm × 400 mm |
| | 600 mm × 200 mm |
| | 600 mm × 400 mm |
| | 800 mm × 400 mm |
| | 280 mm × 150 mm |

Examples of a full identification for a particular FDMI variant would be "VESA MIS-D, 100, C" or "VESA MIS-F, 200, 200, 6" where the letter after "MIS-" identifies the part of the standard used, such as part B, C, D, E for flat displays with 10-78 cm diagonal, and part F for flat displays with 79-230 cm diagonal. For part D, a number identifies the 75 mm and 100 mm variants (100 or 75). For part F, a number pair identifies the maximum width and height of the mounting-hole pattern. For parts B-E, a final letter identifies the interface location on the flat display as center (C), top (T), bottom (B), left (L), right (R), top and bottom (T/B), or left and right (L/R). For part F, a final digit distinguishes between 10 mm deep M6 mounting holes (6) and 15 mm deep M8 holes (8). In addition to mounting-hole patterns, the standard also specifies requirements for the location of cable exits.

The VESA mount 52 enables the same generic monitor support 23 to attach to and support a wide assortment of monitors 22 that may be, for example, be supplied by different manufacturers with different features and sizes. The VESA mount 52 preferably includes a substantially flat bracket 54 attached to two pivot points 56 shown in FIG. 12, which permit rotation of the bracket 54, and thus variations in the viewing angle of the monitor 22. The pivot points 56 preferably provide for tension that can be modified by adjusting nuts 64.

Figure 12:
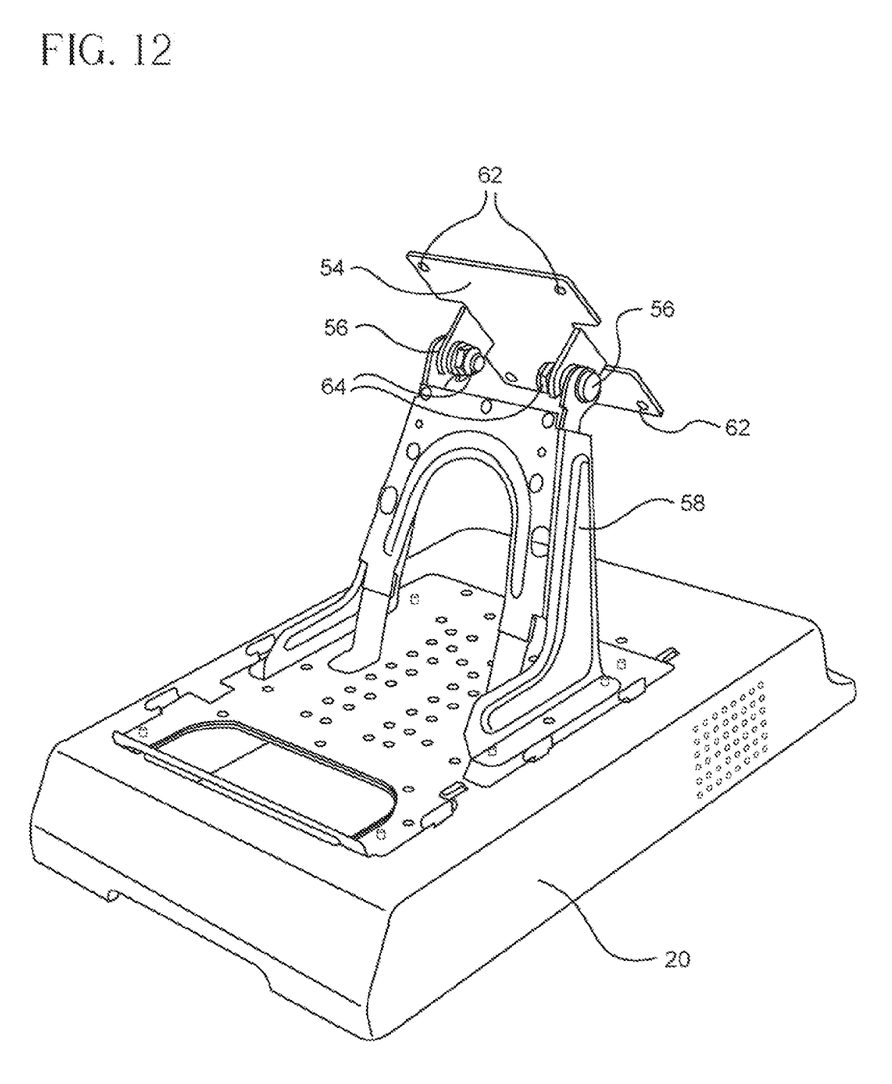
FIG. 12 is a side pictorial view showing the third embodiment shown in FIG. 11.

The bracket 54 is preferably supported by a generally upright arm 58 attached to the base 20. The bracket 54 is preferably attached to the rear of the monitor 22 using screws 60 extending through the holes 62 in the bracket 54 and corresponding holes in the monitor 22. A housing 64 is preferably used to at least partially enclose the arm 58. A housing or cover 52 is used to at least partially encloses the bracket 54 when attached to the monitor 22.

The VESA mount described above is intended as an example of any mounting method and/or structure known in the art including modifications of such mounting methods and/or structures that enables interchangeability without limiting the scope of the present invention in any way. For example, alternative mounting interfaces, such as that utilized in the Viewsonic® monitor Model No. VA712b and are intended to be within the scope of the present invention.

Accordingly, the advantages provided by the integrates POS terminal system with the interchangeable base in accordance with the present invention include the following:

1. The system substantially reduces problems associated with obsolescence. For example, in the simplest configuration, the terminal system may be downgraded to a touch screen monitor with a simple passive base shown in FIG. 6.
2. As future applications impose different requirements, such as a more powerful CPU or a larger monitor, a different or larger base and/or the replaced monitor can be removed and a new monitor substituted, if required.
3. The interchangeable base can be redesigned to accommodate different footprints or styles to match and/or complement additional physical requirements, thus providing complete flexibility concerning variations in the shape, style, and/or dimensions of the system footprint.
4. The VESA mount enables a standardized interface to a wide assortment of monitors.

Although illustrative embodiments of the present invention have been described herein with reference to the accompanying drawing, it is to be understood that the invention is not limited to those precise embodiments, and that various other changes and modifications may be affected therein by one skilled in the art without departing from the scope or spirit of the invention.

What is claimed is:

1. A point-of-sale system comprising:
   a monitor; and
   a plurality of interchangeable bases configured for POS applications, the monitor being attached to at least one of the plurality of interchangeable bases using a Video Electronics Standards Association (VESA) mount, each of the plurality of interchangeable bases being configured to house a processing device with a different performance.

2. The point-of-sale system defined by claim 1, further comprising a monitor support disposed between the monitor and at least one of the plurality of interchangeable bases, the monitor being attached to the monitor support using the VESA mount, the monitor support being attached to the at least one of the plurality of interchangeable bases.

3. The point-of-sale system defined by claim 2, further comprising a housing adapted to at least partially enclose the monitor support.

4. The point-of-sale system defined by claim 1, further comprising a housing adapted to at least partially enclose the VESA mount.

5. A point-of-sale monitor comprising:
   a display; and
   a monitor support, the monitor support being attached to the display using a Video Electronics Standards Association (VESA) mount, the monitor support being adapted to be attached to a plurality of interchangeable bases configured for POS applications, the display being configured to be selectively attached to each of the plurality of interchangeable bases and detached from each of the plurality of interchangeable bases, each of the plurality of interchangeable bases being configured to house a processing device with a different performance.

6. The point-of-sale monitor defined by claim 5, further comprising a housing adapted to at least partially enclose the VESA mount.

7. A method of displaying point-of-sale information comprising:
   providing a monitor;
   adapting a plurality of interchangeable bases configured for POS applications to attach to the monitor using a Video Electronics Standards Association (VESA) mount, each of the plurality of interchangeable bases being configured to house a processing device with a different performance.

8. The method of displaying point-of-sale information defined by claim 7, further comprising:
   disposing a monitor support between the monitor and at least one of the plurality of interchangeable bases;
   attaching the monitor to the monitor support using the VESA mount; and
   attaching the monitor support to the at least one of the plurality of interchangeable bases.

9. The method of displaying point-of-sale information defined by claim 7, further comprising adapting a housing to at least partially enclose the VESA mount.

10. The method of displaying point-of-sale information defined by claim 7, further comprising adapting a housing to at least partially enclose the monitor support.

* * * * *